United States Patent
Pouchak et al.

(10) Patent No.: US 6,549,826 B1
(45) Date of Patent: Apr. 15, 2003

(54) VAV AIRFLOW CONTROL FOR PREVENTING PROCESSOR OVERFLOW AND UNDERFLOW

(75) Inventors: Michael A. Pouchak, St. Anthony, MN (US); Roger R. Roth, Minnetonka, MN (US)

(73) Assignee: Honeywell International Inc., Morristown, NJ (US)

( * ) Notice: Subject to any disclaimer, the term of this patent is extended or adjusted under 35 U.S.C. 154(b) by 116 days.

(21) Appl. No.: 09/696,122

(22) Filed: Oct. 25, 2000

(51) Int. Cl.$^7$ ............................................. G05B 13/02
(52) U.S. Cl. ........................ 700/276; 700/275; 700/277
(58) Field of Search ................................. 700/277, 301, 700/276, 278, 275

(56) References Cited

U.S. PATENT DOCUMENTS

| | | |
|---|---|---|
| 4,585,163 A | 4/1986 | Cooley et al. |
| 4,784,580 A * | 11/1988 | Takata et al. ............ 236/15 BD |
| 5,312,297 A * | 5/1994 | Dieckert et al. ............ 454/238 |
| 5,479,812 A | 1/1996 | Juntunen et al. |
| 5,605,280 A * | 2/1997 | Hartman ................. 165/209 |
| 5,863,246 A | 1/1999 | Bujak, Jr. |
| 5,875,109 A | 2/1999 | Federspiel |

OTHER PUBLICATIONS

Excel 10 Variable Air vol. Box Controllers, Honeywell Form, 63–9041 (2–97).

\* cited by examiner

*Primary Examiner*—Leo Picard
*Assistant Examiner*—Alexander Kosowski

(57) ABSTRACT

A method for controlling a variable airflow apparatus to prevent processor overflow and underflow, with the variable airflow apparatus including an airflow sensor for providing an airflow sensor signal, a stored relationship between the airflow sensor signal and an airflow value, a damper for varying airflow, and an actuator for positioning the damper. The method includes energizing the airflow controller, determining either a minimum allowed airflow value based on the stored relationship between the airflow signal and an airflow value, or determining a maximum allowed airflow value based on the stored relationship, and periodically positioning the damper to provide an airflow value within a range limited by the minimum allowed airflow value or the maximum allowed airflow value in response to a signal from the airflow controller.

11 Claims, 5 Drawing Sheets

VAV AIRFLOW CONTROL FOR PREVENTING PROCESSOR OVERFLOW AND UNDERFLOW

BACKGROUND OF THE INVENTION

The present invention relates generally to Variable Air Volume (VAV) Heating, Ventilating and Air Conditioning (HVAC) systems and particularly to the control of individual VAV terminal units served by a VAV system.

VAV systems primarily control the space temperature by varying the volume of supply air rather than the temperature of the supply air. The interior zones of most large buildings normally require only cooling because of occupancy and lighting loads. In a typical interior zone application, VAV air terminal units serve these zones and operate under thermostatic control to vary the airflow of cooling air to the individual spaces to maintain the required temperature. In some interior zone applications and in other applications the VAV terminal units may also include provisions for heating coils. VAV systems offer economy of installation and operation and have become the system of choice for many building occupancy types. A variety of air terminal units are available. For example, a single duct throttling type air terminal unit may be used with a space sensor that resets the setpoint of an air flow controller located at the air terminal unit to vary the volume of conditioned air to the space as required.

The availability of low cost digital electronics allows building managers to benefit from building control systems that use airflow sensors that are connected to distributed intelligence networks. This advance presents some new challenges, e.g., the processing power available to the sensor is limited by a local inexpensive processor, and the airflow sensor itself must be low cost.

Pressure-independent VAV systems require a calculation to convert the sensed value of the pressure, obtained via a flow pickup device which is stored internally as a voltage, to a value known as a flow velocity or air flow and is typically expressed in feet per minute (fpm). The representation of the transfer function between air pressure and volts in a pressure transducer is typically linear, but the conversion from air pressure to air velocity is a non-linear relationship more accurately described by the equation:

$$\text{Airflow} = \sqrt{\text{Airpressure}} \cdot K$$

where airflow is the airflow across the pressure transducer and the air pressure is the corresponding air pressure derived from the airflow. K is a constant for each flow sensor type that may adjust slightly with velocity.

This calculation of flow velocity must be performed frequently, for example, the calculation may typically be needed every second in order to ensure sufficient information required for timely airflow control. The calculation of airflow velocity requires both time and resource intensive processes to multiply and divide stored variables to obtain the required values. Typically, in a low cost processor, the time required to do multiply and divide operations on a value is very expensive, so for a given task in a typical process, the amount of operations allowed is limited to one or two calculations, which is a severe processing power calculation restriction.

An alternative to the frequent calculation of airflow values from measured air pressure values is to include a linearization table or equation in the airflow controller. The linearization table relates a specific number of air pressure values to a corresponding number of airflow values and can be used to construct a curve of airflow as a function of air pressure. A measured air pressure is then related to an airflow by using the curve. A significant number of calculations by the processor are required to relate a specific measured air pressure to a corresponding airflow.

There is a need to avoid additional runtime error limit checks which are expensive in terms of time and resources. There is a need to prevent microprocessor overflow and underflow.

In addition to the calculations necessary to determine airflow, the processor has a number of other tasks. For example., analog to digital conversion, providing frequent commands to a damper actuator, i/o communications, and network communications.

Large quantities of VAV terminal units and their associated controls are typically required in a building. Therefore it is important that the controls and installation techniques used be as cost effective as possible.

Thus, a need exists for a low-cost high-performance VAV controller that provides for accurate error and bounds checking within the processing power and resources of the local inexpensive processor.

SUMMARY OF THE INVENTION

The present invention solves these and other needs by providing a method for controlling a VAV air terminal unit that includes an airflow sensor for providing an airflow sensor signal to an airflow controller, a stored relationship between the airflow signal and an airflow value, a damper for varying airflow, and an actuator for positioning the damper in response to an airflow controller signal. The method includes energizing the controller by applying electrical power, determining either a minimum allowed air flow value based on the stored relationship, or determining a maximum allowed airflow value based on the stored relationship and periodically positioning the damper in response to the airflow controller signal, to provide an airflow value within a range that is limited by either the minimum allowed airflow value or the maximum allowed airflow value.

DESCRIPTION OF THE PREFERRED EMBODIMENT

Figure 1:
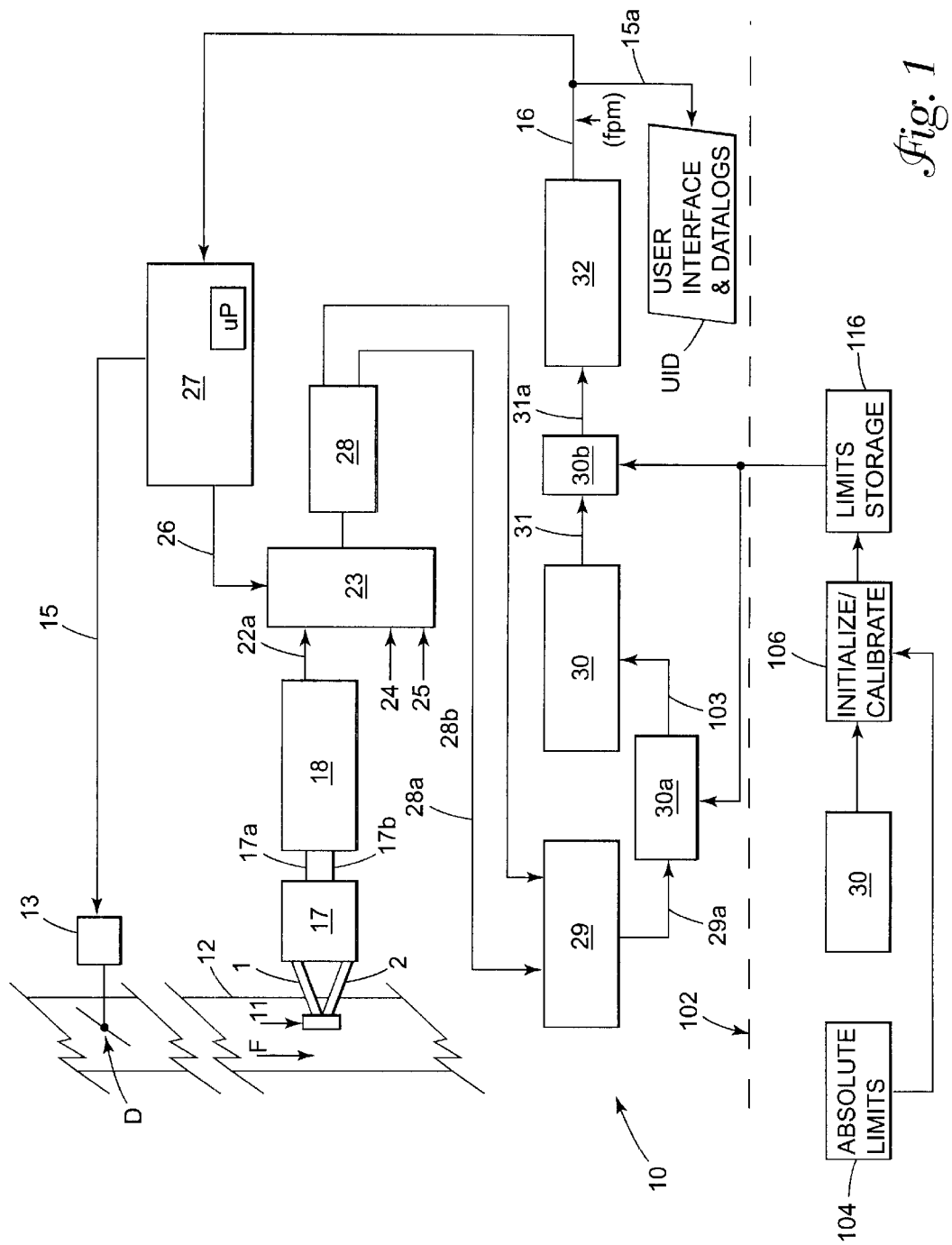
FIG. 1 is a block diagram of the flow of information signals from an airflow duct sensor to various control devices according to the principles of the present invention.

An apparatus and method for VAV airflow control for preventing overflow and underflow calculations according to the teachings of the present invention is shown in the drawings. In the preferred embodiment of the present invention, the apparatus for providing calibrated and linearized flow sensors is of the type shown and described in U.S. Pat. No. 5,479,812. For purpose of explanation of the basic teachings of the present invention, the same numerals designate the same or similar parts in the present figures and the figures of U.S. Pat. No. 5,479,812. A brief description of the common numerals and the apparatus for providing calibrated and linearized flow sensors may be found herein, and a more complete description may be found in U.S. Pat. No. 5,479,812, which is herein incorporated by reference.

FIG. 1 of the present application includes additional information that was added to FIG. 1 of U.S. Pat. No. 5,479,812, to illustrate certain details of the present invention.

The present invention will be discussed in relation to the process that occurs during normal runtime operation, and the process that occurs upon initialization, i.e., when power is applied to the controller. In order to place the present invention in context, a brief discussion of the normal runtime operation is provided first. In FIG. 1 those processes occurring during runtime operation are shown above dotted line 102, and those processes occurring at initialization are shown below line 102.

Sensor pickup device 11 is located in air duct 12 to measure flow F of passing air to control damper D. Tubes or hoses 1 and 2 transfer the up and down stream pressure at device 11 to a low-cost airflow sensor 17. Controller motor 13 is operated in response to a signal which is derived from a control algorithm contained in control system 27 and sent by system 27 across line 15 in order to actuate damper D. Controller 27 employs knowledge of the user-desired setpoint (flow and temperature), together with output 16 indicating the amount of airflow (preferably in feet per minute) to produce a control signal to send on line 15 to actuator 13 so as to position damper D. The signal on line 15a provides information to a User Interface Device. The signals on line 17a and 17b are to the inverting and non-inverting inputs of operational amplifier 18. Multiplexor switch 23 selects, according to instructions on line 26 from microprocessor 27, one of analog inputs 22a, 24, or 25 to be converted to a digital count value. The output of multiplexor 23 goes to an A/D converter device 28 which produces both reference voltage counts and flow sensor voltage counts across lines 28a and 28b respectively. The flow sensor counts are corrected via reference voltage correction device 29, producing an output on line 29a of a voltage level related to airflow.

Figure 2:
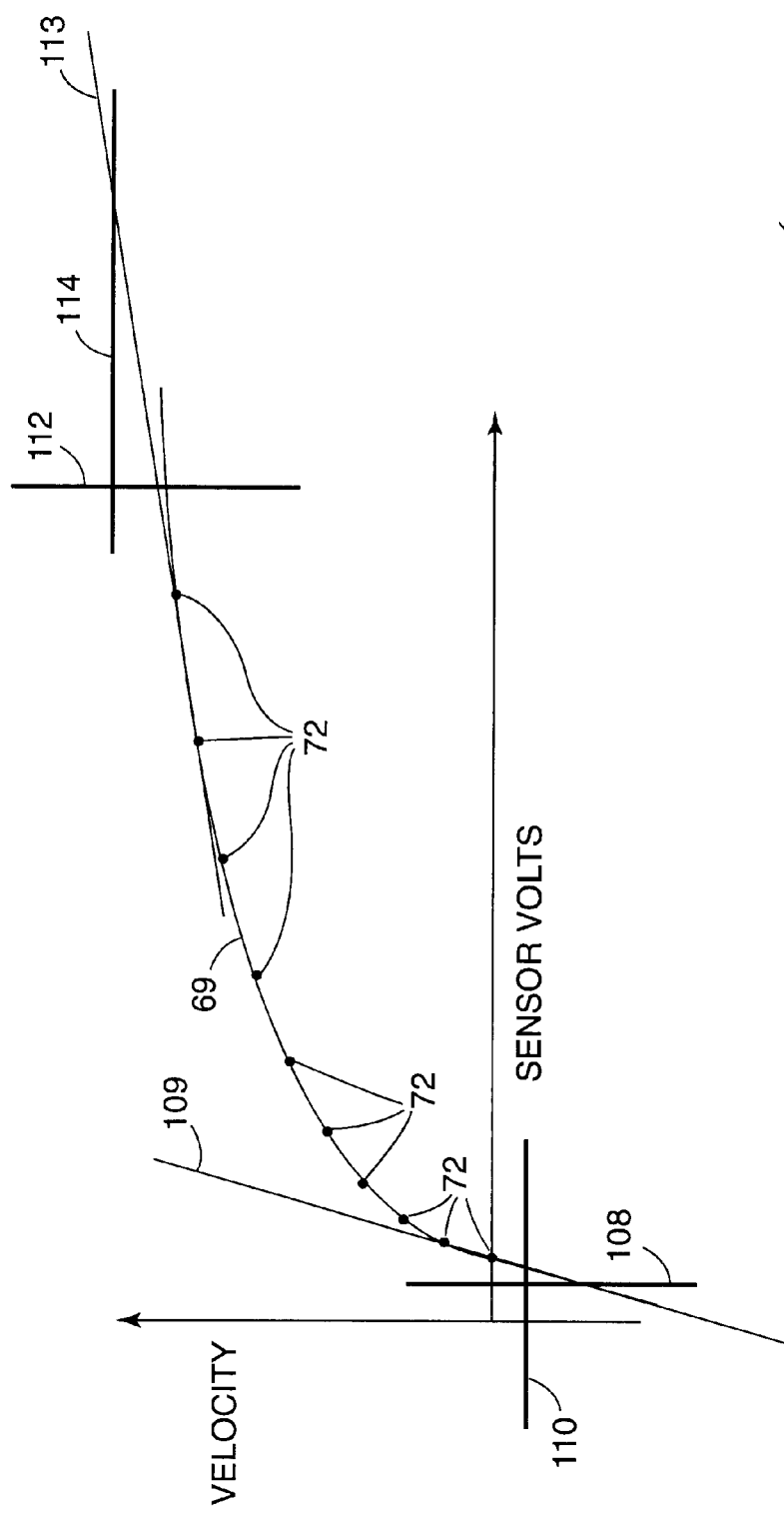
FIG. 2 is a system linearization curve showing certain details of the present invention.

FIG. 2 includes a plot 69 of airflow sensor signal values 72, i.e., line 29a voltage values, versus airflow values having a first portion of relatively low airflow signal values and relatively low air flows and a second portion of relatively high airflow signal values and relatively high air flows. According to the principles of the present invention, absolute limits for the airflow sensor signal 29a must be established for the minimum allowed voltage, axis 108, the minimum allowed airflow value, axis 110, the maximum allowed voltage, axis 112, and the maximum allowed air flow value, axis 114. These absolute limits give consideration to both hardware limitations and calculation limitations and are established in the controller at the time of initialization. Voltage values and airflow values that are within such absolute minimum and maximum limits must be calculated for the specific airflow sensor that is connected to the controller at the time of initialization, as is explained herein. The processes, as described for the various process modules, may be implemented in firmware within a variable air volume box controller. Absolute limits module 104 stores the absolute voltage limits and the absolute airflow limits. Initialization/Calibration module 106 receives the absolute limits information from module 104 and performs the calculations described herein that occur upon initialization of the controller. Initialization/ Calibration Module 106 also receives information that relates airflow signal voltage values to airflow values from Linearization table 30 and provides information on the intercepts of voltage axis 108 and airflow axis 110 that are used in determining calculated minimums, and information on the intercepts of voltage axis 112 and airflow axis 114 that are used in determining calculated maximums. This information is transferred to Limits Storage module 116 which provides the information to Runtime Voltage Limits Module 30a and Runtime Airflow Limits Module 30b. Module 30a uses the calculated minimum low voltage, VminCalc, and the calculated maximum voltage, VmaxCalc, to immediately limit Output 29a to values within this range. The output of module 30a is voltage limited value 103. Linearization table 30 converts voltage limited value 103 to a flow value 31 that can be further limited by the Runtime Airflow Limits Module 30b and then passed on as signal 31a to the field calibration process.

Prerequisites to Performing the Airflow Limit Overflow/ Underflow Calculation:

1. The controller must possess an accurate and calibrated pressure to flow conversion equation or table stored internally as a voltage (typically linearly proportional to the pressure) to airflow table or equation. This typically involves knowing the manufacturer pressure to flow equation for a particular VAV box size, the characteristics of the air flow sensor and conversion to voltage through highly sensitive pneumatic/electric transducer amplification devices. This disclosure does not discuss the creation of this table or application of processes to create an accurate voltage to flow conversion table or equation.
2. The limits for the sensor pressure or sensor flow must be known for minimum and maximum in feet per minute.
3. The voltage output from the voltage amplifier that has amplified the voltage from pressure transducer must be known.
4. The flow table and controller flow parameters must not have changed and must be known to be stable.

Figure 3A:
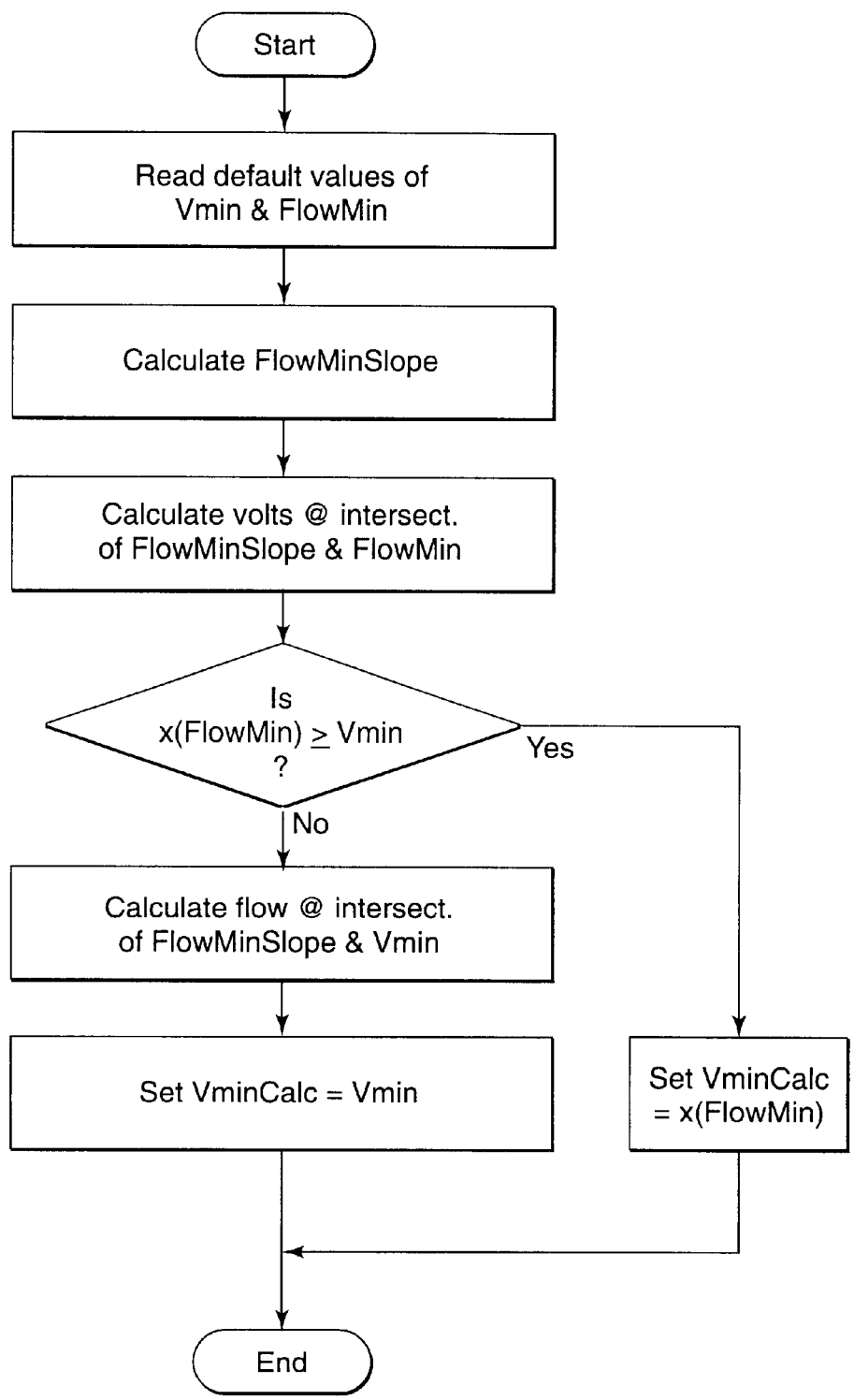
FIGS. 3a–3c are flowcharts which illustrate a sequence of operations for the present invention.
Figure 3B:
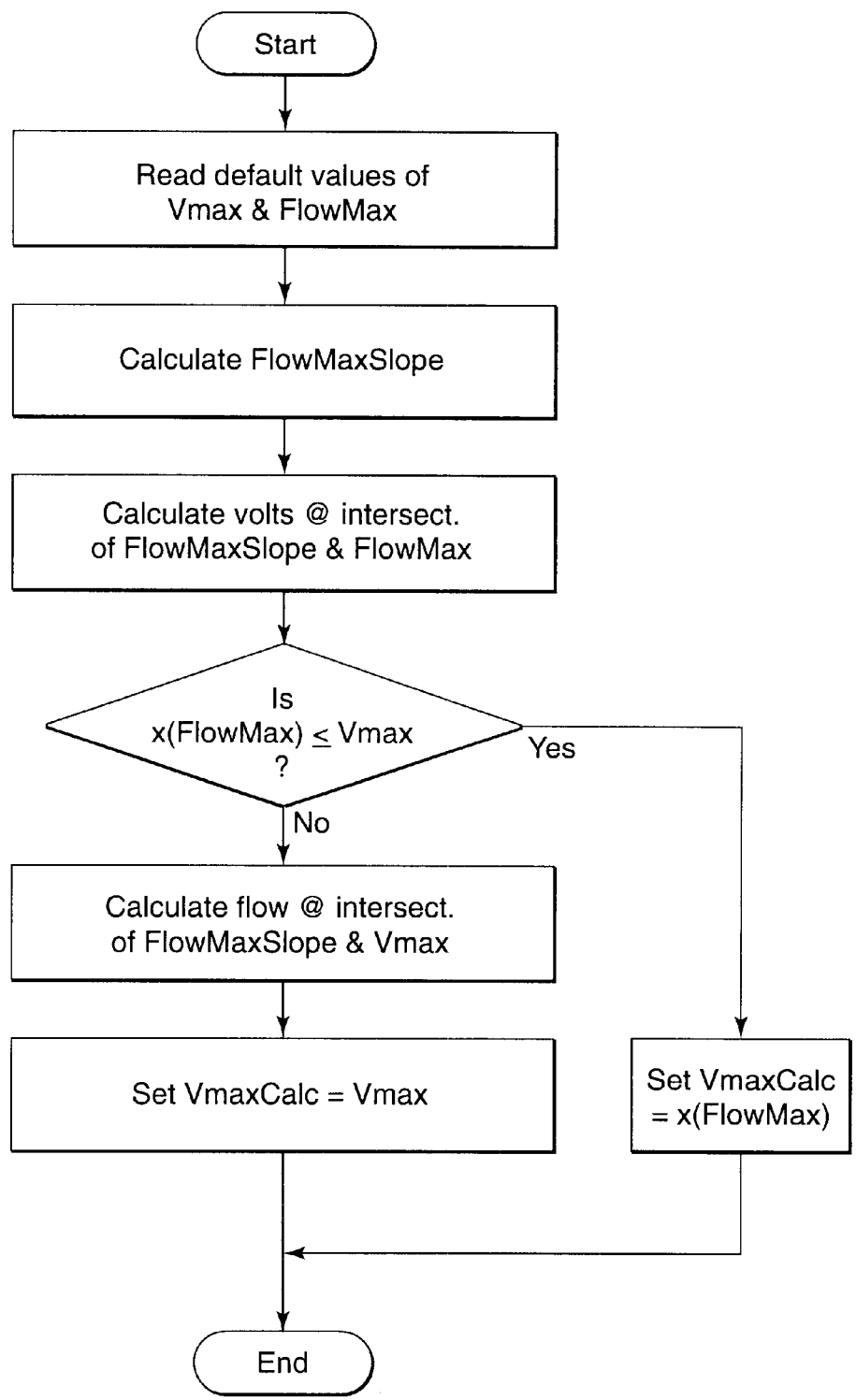

On controller initialization:

FIGS. 3a and 3b show certain details related to initialization

1. Determine the minimum allowed voltage for the air pressure sensor to create. This limit may be different from the hardware limitation for the air pressure sensor. Typically, the air pressure is proportional to the voltage created, although there may be non-linearities due to the low-cost sensor that may have to be accounted for. In this example, we will select the absolute minimum voltage as 0.25 volts. This value is know as Vmin and is designated by axis 108 in FIG. 2.
2. Determine the absolute minimum allowed flow value for the air pressure sensor to create. In typical applications, air flows below −300 feet per minute (fpm) are considered invalid. This value is known as FlowMin and is designated by axis 110 in FIG. 2.
3. Now determine the instantaneous slope of the flow volts (x axis) to feet per minute (fpm) graph at the minimum entry of either the flow table or the flow equations. Typically, the flow volts to flow velocity graph only covers from 0.5 volts to 4.5 volts with flows from 0 fpm to 3500 fpm. This slope is referred to as FlowMinSlope. If the first entry is x(0), y(0) and the second entry is x(1), y(1), then the slope is (y(1)−y(0))/(x(1)−x(0)).
4. From slope 109, the corresponding value of Volts for FlowMin should be calculated. The value should be x(FlowMin). For example, if FlowMin is −300 fpm, the calculated value of Volts may have been 0.33 volts.
5. From slope 109, the corresponding value of Flow for VoltsMin should be calculated. The values should be y(VoltsMin). For example, if the VoltsMin is 0.25 volts, the corresponding value for flow may be −428 fpm.
6. The flow versus voltage curve will first intercept one axis of either the minimum voltage, axis 108, of 0.25 volts, or the minimum flow, axis 110, of −300 fpm. In general, only one set of calculations from step 4 or 5 will be valid. Since if the calculated value of volts from step 4 is still greater than VoltsMin and the flow value is>=−300 fpm, the calculation for volts based on step 4 for will be used. Therefore, the VminCalc will be set to 0.33 volts.

7. Determine the absolute maximum allowed voltage for the air pressure sensor to create. This limit may be different from the hardware limitation for the air pressure sensor. Typically, the air pressure is proportional to the voltage created, although there may be non-linearities due to low cost sensor that may have to be accounted for. In this example, we will select the maximum voltage as 5.0 volts. This Value is know as Vmax and is designated by axis 112 in FIG. 2.

8. Determine the maximum allowed flow value for the air pressure sensor to create. In typical applications, air flows above 3500 feet per minute (fpm) are considered invalid. This value is known as FlowMax and is designated by axis 114 in FIG. 2.

9. Now determine the instantaneous slope of the flow volts (x axis) to feet per minute (fpm) graph at the maximum entry of either the flow table or the flow equations. This slope is referred to as FlowMaxSlope. Typically, the flow volts to flow velocity graph only covers from 0.5 volts to 4.5 volts with-flows from 0 fpm to 3500 fpm. If the last entry is x(9), y(9) and the second to last entry is x(8), y(8), then the slope is (y(9)−y(8))/(x(9)−x(8)).

10. From slope 113, the corresponding value of Volts for FlowMax should be calculated. The value should be x(FlowMax). For example, if FlowMax is +3500 fpm, the calculated value of Volts may have been 5.4 volts.

11. From slope 113, the corresponding value of Flow for VoltsMax should be calculated. The values should be y(VoltsMax). For example, if the VoltsMax is 5.0 volts, the corresponding value for flow may be 3324 fpm.

12. The flow versus voltage curve will first intercept one axis of either the maximum voltage, axis 112, of 5.0 volts or the maximum flow, axis 114, of 3500 fpm. In general, only one set of calculations from step 10 or 11 will be valid. Since the calculated value of volts from step 10 is greater than 5.0 volts, and the flow corresponding to 5.0 volts from step 11 is<=3500 fpm, the calculation for volts based on step 11 will be used. Therefore, VmaxCalc will be set to 5.0 volts.

Figure 3C:
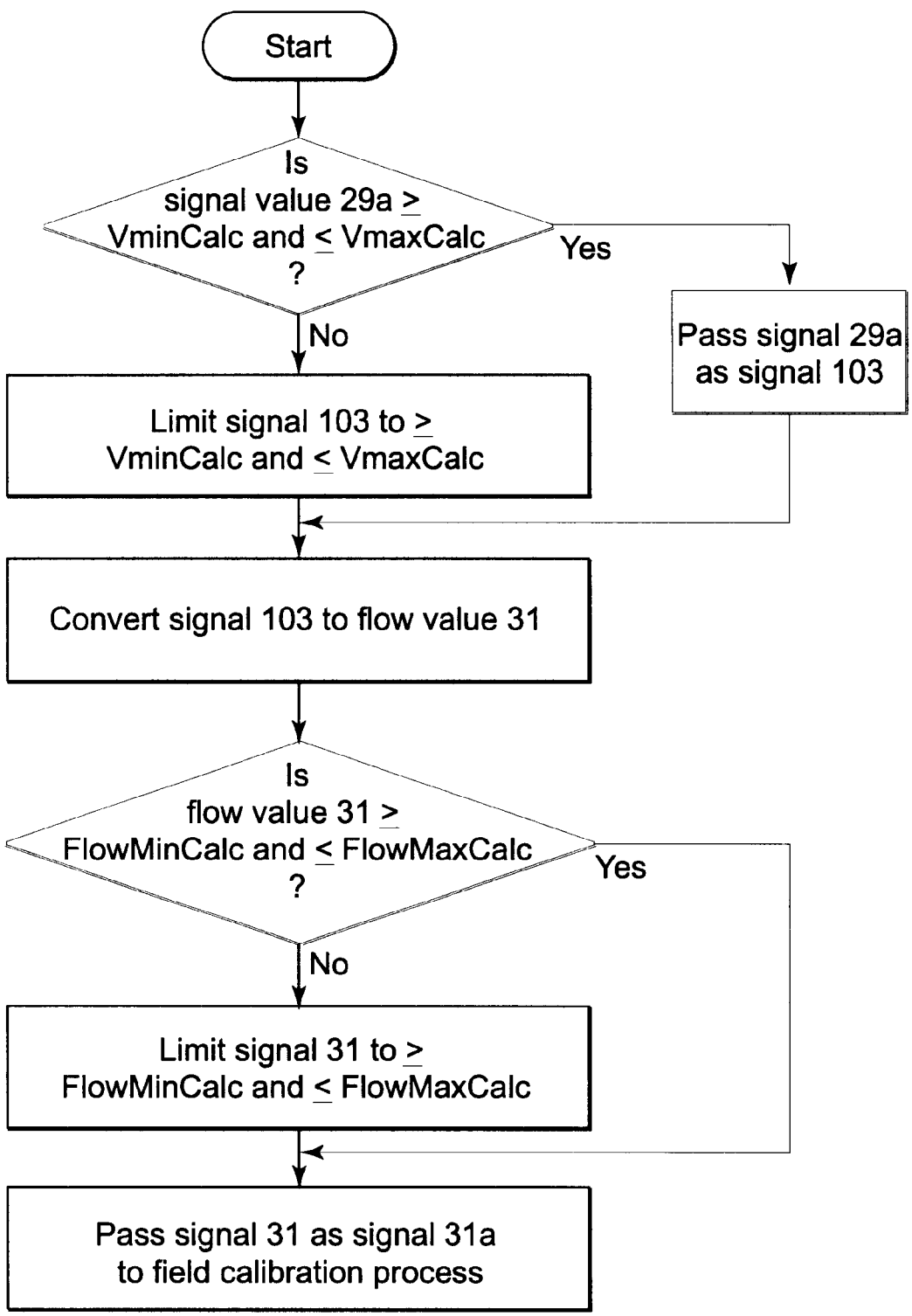

Run time calculation flow:

FIG. 3c shows certain details related to runtime operation.

As described in steps 1 through 12, only voltages at line 29a equal to or greater than VminCalc, 0.33 volts, or equal to or less than VmaxCalc, 5.0 volts, will be accepted by module 30b and will result in signal 3a.

With the minimum and maximum voltages prefiltered to correspond to valid flow ranges, the runtime calculation becomes much simpler and faster. The flow voltage should immediately be limited to greater than VminCalc and less than VmaxCalc.

A Checksum of changes to nonvolatile equations or lookup tables corresponding to duct parameters such as duct size, the flow table, or flow configuration information should force a recalculate of the VminCalc and VmaxCalc. This eliminates any possibility of changes to the configuration being unaccounted for during runtime.

Now that the construction and operation of the present invention have been set forth, many advantages can be further set forth and appreciated.

The invention was illustrated by determining an approximate slope for the first two points and an approximate slope for the last two points shown on curve 69. The invention could also use the instantaneous slope of selected points or other properties of the curve 69.

The present invention allows low cost components to be utilized with individual zone controllers in buildings with Variable Air Volume (VAV) Heating and Air Conditioning systems without sacrificing flow control calculation accuracy and error checking limits.

The information calculated at initial startup of the control process, and at subsequent start ups, allows representations of internal flow and voltage limits of the air flow control system to limit the amount of real-time calculation information to be processed. These limits can also prevent incorrect calculations and compensate for imperfections in the calibration and installation process, such as inaccurate data, turbulence, balance mechanical failures, and air stream disruption.

In addition, the calculated limits can compensate for an incorrectly designed air flow pickup table or an incorrectly point-distributed air flow pickup table in a custom-designed air flow pickup table. For example, if the table has all the points distributed at the low flow, low-pressure end of the curve, the extrapolated values for the high flow, high-pressure end of the curve will result in extremely large air flow. The limit calculation of the present invention prevents air flow tables with a disproportional amount of points in the low part of the curve from creating overflow during high-pressure conditions with disastrous control results.

The present invention has been illustrated by describing a specific application to air terminal units supplied by a central variable air volume system. It is to be understood that the present invention has other applications to systems requiring control of variable airflow. Examples of such systems include supply fan and return fan tracking and laboratory fume hood control.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than the foregoing description, and all changes which come within the meaning and range of equivalency of the claims are intended to be embraced therein.

I claim:

1. A method for initializing a control system for a variable airflow apparatus so as to reduce subsequent calculations, said apparatus having an airflow sensor for providing an airflow sensor signal to an airflow controller, a stored relationship representative of a plot of airflow sensor signal values versus airflow values having a first portion of relatively low airflow signal values and relatively low air flows, a damper for varying airflow, and an actuator for positioning said damper, comprising the steps of:

energizing said airflow controller;

determining a first slope of a portion of said plot within said first portion;

determining an intersection of said first slope with an absolute minimum voltage value or an absolute minimum airflow value;

setting a first limit on an allowed minimum airflow based on said intersection; and subsequently periodically positioning said damper, in response to a signal from said airflow controller, to provide an airflow value that is limited by said first limit.

2. Method of claim 1 wherein said first slope first intersects said absolute minimum voltage value, and said step of determining an intersection of said first slope comprises the step of calculating an allowed minimum airflow value that corresponds to said absolute minimum voltage value.

3. Method of claim 1 wherein said stored plot comprises a second portion of relatively high airflow signal values and relatively high air flows, and said step of determining said first limit comprises the steps of:
- determining a second slope of a portion of said plot within said second portion; and
- determining said first limit from an intersection of said second slope with an absolute maximum voltage value or an absolute maximum airflow value.

4. A method for initializing a control system for a variable air flow apparatus having an airflow sensor for providing an airflow sensor signal to an airflow controller, a stored relationship representative of a plot of airflow sensor signal values versus airflow values having a first portion of relatively low airflow signal values and relatively low air flows and a second portion of relatively high air flow signal values and relatively high air flows, a damper for varying airflow, and an actuator for positioning said damper, comprising the steps of:
- energizing said airflow controller;
- determining a minimum allowed airflow value based on a property of said first portion;
- determining a maximum allowed airflow value based on a property of said second portion; and
- subsequently periodically positioning said damper to provide an airflow value within a range defined by said minimum allowed airflow value and said maximum allowed airflow value in response to a signal from said airflow controller.

5. Method of claim 4 wherein said step of determining a minimum allowed airflow comprises the steps of:
- determining a first slope of a portion of said plot within said first portion; and
- determining a first intersection of said first slope with an absolute minimum voltage value or an absolute minimum airflow value.

6. Method of claim 5 wherein said step of determining a maximum allowed airflow comprises the steps of:
- determining a second slope of a portion of said plot within said second portion; and
- determining an intersection of said second slope with an absolute maximum voltage value or an absolute maximum airflow value.

7. A method for initializing a control system for a variable air flow apparatus so as to reduce subsequent calculations, said apparatus having an air flow sensor for providing an air flow sensor signal to an air flow controller, a stored relationship representative of a plot of air flow sensor signal values versus airflow values having a first portion of relatively low air flow signal values and relatively low air flows and having a second portion of relatively high air flow signal values and relatively high air flows, a damper for varying air flow and an actuator for positioning said damper comprising the steps of:
- energizing said air flow controller;
- determining a first slope of a portion of said plot within said first portion;
- determining a first intersection of said first slope with an absolute minimum voltage value or an absolute minimum airflow value;
- determining a minimum allowed airflow value based on said first intersection with an absolute minimum voltage value or an absolute minimum airflow value;
- determining a second slope of a portion of said plot within said second portion;
- determining a first intersection of said second slope with an absolute maximum voltage value or an absolute maximum airflow value;
- determining a maximum allowed airflow based on said first intersection of said second slope with an absolute maximum voltage value or an absolute maximum airflow value; and
- subsequently periodically positioning said damper to provide an air flow value within a range defined by said minimum allowed air flow value and said maximum allowed air flow value in response to a signal from said air flow controller.

8. Method of claim 7 wherein said airflow apparatus comprises an air terminal unit supplied by a variable air volume system.

9. A control initialization system for a variable airflow apparatus, said apparatus having an airflow sensor providing a signal to an airflow controller, a stored relationship representative of a plot of air flow sensor signal values versus airflow values having a first portion of relatively low air flow signal values and relatively low air flows and having a second portion of relatively high air flow signal values and relatively high air flows, a damper for varying said airflow, and an actuator for positioning said damper comprising:
- means for energizing said controller;
- means for calculating a minimum allowed airflow value based on a characteristic of said first portion and an absolute minimum voltage value or an absolute minimum airflow and for calculating a maximum allowed airflow value based on a characteristic of said second portion and an absolute maximum voltage value or an absolute maximum airflow value;
- means for storing said minimum allowed airflow value and said maximum allowed airflow value; and
- means for subsequently positioning said damper to provide an airflow value within a range defined by said minimum allowed airflow value and said maximum allowed airflow value in response to said airflow sensor signal.

10. Control initialization system of claim 9 wherein said means for calculating a minimum allowed airflow comprises:
- means for determining a first slope of a portion of said first portion; and
- means for determining a first intersection of said first slope with an absolute minimum voltage value or an absolute minimum airflow value.

11. Control initialization system of claim 10 wherein said means for calculating a maximum allowed airflow comprises:
- means for determining a second slope of a portion of said second portion; and
- means for determining an intersection of said second slope with an absolute maximum voltage value or an absolute maximum airflow value.

* * * * *